(12) United States Patent
Horn

(10) Patent No.: US 10,740,242 B2
(45) Date of Patent: Aug. 11, 2020

(54) SENSING DEVICE DATA CACHING

(71) Applicant: Western Digital Technologies, Inc., San Jose, CA (US)

(72) Inventor: Robert L. Horn, Yorba Linda, CA (US)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 16/020,992

(22) Filed: Jun. 27, 2018

(65) Prior Publication Data

US 2018/0307611 A1 Oct. 25, 2018

Related U.S. Application Data

(63) Continuation of application No. 14/971,995, filed on Dec. 16, 2015, now Pat. No. 10,019,372.

(51) Int. Cl.
*G06F 3/06* (2006.01)
*G06F 12/0873* (2016.01)

(52) U.S. Cl.
CPC ............ *G06F 12/0873* (2013.01); *G06F 3/06* (2013.01); *G06F 3/0611* (2013.01); *G06F 3/0656* (2013.01); *G06F 3/0676* (2013.01); *G06F 2212/1021* (2013.01); *G06F 2212/1024* (2013.01); *G06F 2212/281* (2013.01); *G06F 2212/313* (2013.01)

(58) Field of Classification Search
CPC combination set(s) only.
See application file for complete search history.

(56) References Cited

U.S. PATENT DOCUMENTS

| 6,408,357 B1 | 6/2002 | Hanmann et al. |
| 7,392,340 B1 | 6/2008 | Dang et al. |
| 8,959,284 B1 | 2/2015 | Boyle et al. |
| 8,977,803 B2 | 3/2015 | Horn et al. |

(Continued)

FOREIGN PATENT DOCUMENTS

| EP | 2728485 A1 | 7/2014 |
| KR | 101026789 B1 | 4/2011 |
| KR | 101264380 B1 | 5/2013 |

OTHER PUBLICATIONS

Written Opinion dated Apr. 5, 2017, from international counterpart Application No. PCT/US2016/067013, 5 pages.

(Continued)

*Primary Examiner* — Yong J Choe
(74) *Attorney, Agent, or Firm* — Barry IP Law, P.C.

(57) ABSTRACT

Data is received from a sensing device of a plurality of sensing devices in communication with a device for storage in at least one memory of the device. A first cache memory or a second cache memory of the device is selected for caching the received data based at least in part on the sensing device sending the data. According to another aspect, data is received from a sensing device for storage in at least one memory of a device. It is determined whether to cache the received data based on at least one of the sensing device sending the data and information related to the received data. A cache memory is selected from among a plurality of cache memories of the device for caching the received data based at least in part on the sensing device sending the data.

24 Claims, 8 Drawing Sheets

(56) References Cited

U.S. PATENT DOCUMENTS

| | | |
|---|---|---|
| 2004/0117441 A1 | 6/2004 | Liu et al. |
| 2006/0195646 A1 | 8/2006 | Marsh et al. |
| 2007/0043905 A1 | 2/2007 | Borlick |
| 2011/0055481 A1 | 3/2011 | Murakami |
| 2011/0296085 A1 | 12/2011 | Eleftheriou et al. |
| 2012/0054421 A1* | 3/2012 | Hiratsuka ........... G06F 12/0246 711/103 |
| 2012/0075934 A1* | 3/2012 | Louie ................. G11C 16/0483 365/185.23 |
| 2012/0303896 A1 | 11/2012 | McGroddy-Goetz et al. |
| 2014/0122806 A1 | 5/2014 | Lin et al. |

OTHER PUBLICATIONS

European Search Report, dated Jul. 27, 2018 from related European Application No. 16876714.3, 18 pages.

* cited by examiner

| Device | Cache | Cache All | Min. Allocated | Write Latency | Power | Compression Criteria | Volatile Criteria | Max. Allocated |
|---|---|---|---|---|---|---|---|---|
| 101 | 12, 20 | N | 25% | 2 | 2 | 2 | 3 | 40% |
| 102 | 12 | Y | 45% | 1 | 1 | 1 | 2 | 70% |
| 103 | 152 | N | 25% | 2 | 3 | 2 | 1 | 40% |
| 104 | - | - | 0% | 3 | 3 | 2 | 1 | 0% |

FIG. 2

| Index | Time | Source | Size | Priority | Exp. Access |
|---|---|---|---|---|---|
| 0 | 8/1/15 1:59:10 | 101 | 1 | 0 | 0 |
| 1 | 8/1/15 2:05:11 | 104 | 1 | 0 | 1 |
| 2 | 8/1/15 2:06:53 | 104 | 2 | 1 | 1 |
| ⋮ | ⋮ | ⋮ | ⋮ | ⋮ | ⋮ |
| N | 8/4/15 4:04:36 | 102 | 3 | 0 | 0 |

FIG. 3

SENSING DEVICE DATA CACHING

CROSS-REFERENCE TO RELATED APPLICATION

This application is a continuation of U.S. application Ser. No. 14/971,995, filed on Dec. 16, 2015, entitled "CACHING SENSING DEVICE DATA IN DATA STORAGE DEVICE", the entire contents of which are hereby incorporated by reference.

BACKGROUND

Data Storage Devices (DSDs) are often used to record data onto or to reproduce data from a storage media such as a rotating magnetic disk or a solid-state memory. In some cases, DSDs may be used to archive or store data received from one or more sensing devices such as, for example, video cameras, accelerometers, microphones, or various other sensors. The data received from such sensing devices may arrive at the DSD as a continuous stream of data and eventually consume large amounts of the available storage capacity in the DSD.

Some DSDs may cache data received from a host in a write cache that allows the DSD to defer storing data in its intended location until it is more efficient for the DSD. A DSD may also use a read cache to allow a copy of data stored in another location of the DSD to be accessed more quickly by the host. Caching policies can be used to determine which data is to be cached. The host may provide information about the data stored in the DSD so that a caching policy can result in better decisions about which data should be cached. However, in a system where sensing devices communicate directly with the DSD without a host, such as in an Internet of Things (IoT) application, the DSD typically lacks information about the data being collected and the DSD is unable to fully take advantage of caching to improve power usage and performance.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

FIG. 2 depicts an example of a device table including profiles for sensing devices in communication with a DSD according to an embodiment.

FIG. 3 depicts information related to data received by a DSD according to an embodiment.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

System Overview

Figure 1:
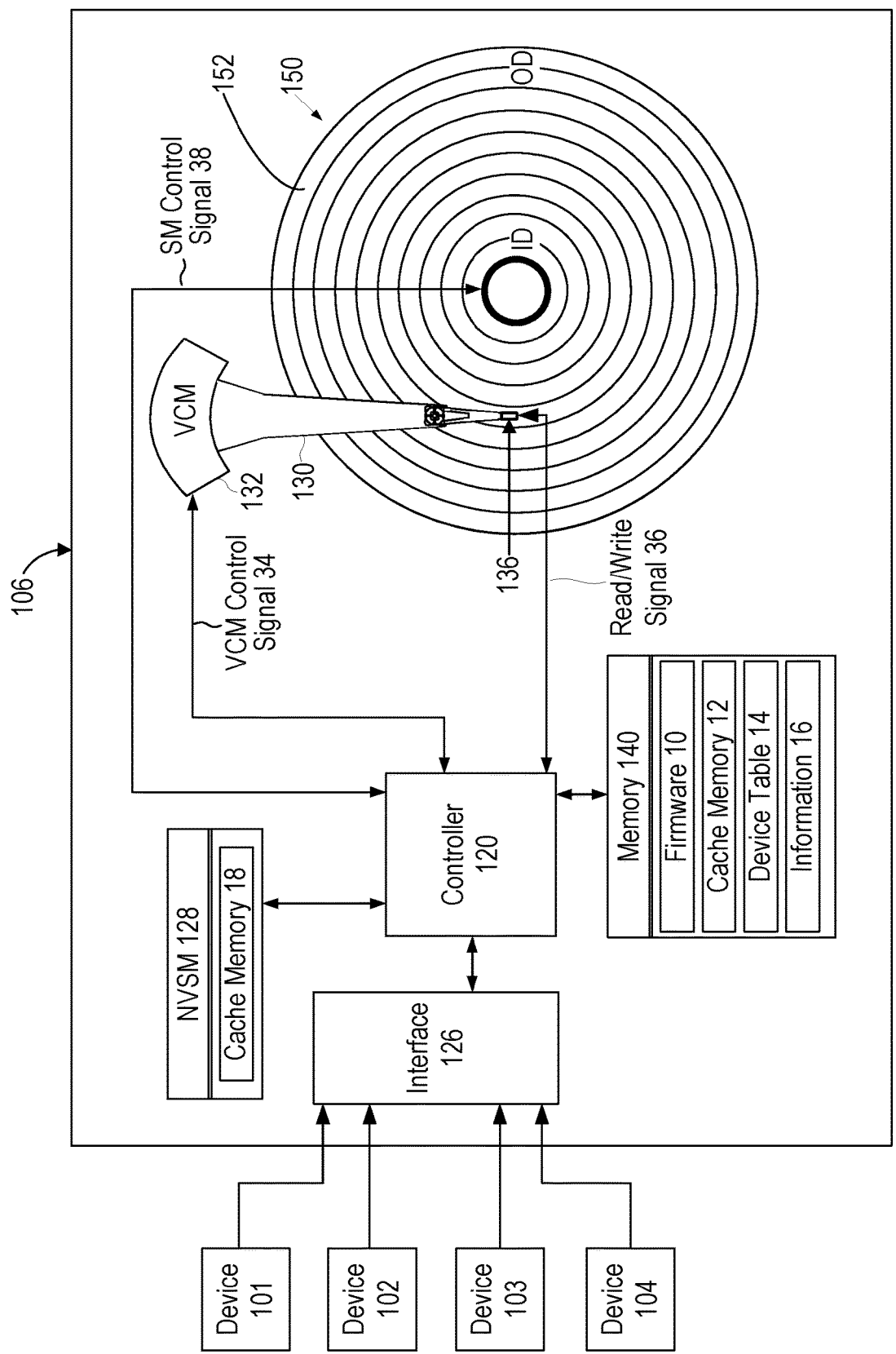
FIG. 1 is a block diagram depicting a Data Storage Device (DSD) according to an embodiment.

FIG. 1 shows an example of Data Storage Device (DSD) 106 which receives data from sensing devices 101, 102, 103, and 104 according to an embodiment. Devices 101 to 104 include sensing devices such as, for example, a video camera, accelerometer, microphone, motion sensor, temperature sensor, humidity sensor, light sensor, or other type of sensing device.

As shown in the example embodiment of FIG. 1, DSD 106 includes Non-Volatile Memory (NVM) in the form of rotating magnetic disk 150 and Non-Volatile Solid-State Memory (NVSM) 128. In other embodiments, DSD 106 can include other NVM media such as magnetic tape. In this regard, one or both of disk 150 and NVSM 128 can be omitted or replaced by a different NVM media. For example, NVSM 128 may be omitted in some embodiments so that the NVM of DSD 106 includes only disk storage media. In yet other embodiments, each of disk 150 or NVSM 128 can be replaced by multiple Hard Disk Drives (HDDs) or multiple Solid-State Drives (SSDs), respectively, so that DSD 106 includes pools of HDDs and/or SSDs.

DSD 106 includes controller 120 which includes circuitry such as one or more processors for executing instructions and can include a microcontroller, a Digital Signal Processor (DSP), an Application-Specific Integrated Circuit (ASIC), a Field Programmable Gate Array (FPGA), hard-wired logic, analog circuitry and/or a combination thereof. In one implementation, controller 120 can include a System On a Chip (SoC).

Interface 126 is configured to interface DSD 106 with devices 101 to 104, and may interface using, for example, Ethernet or WiFi, and/or one or more bus standards. As will be appreciated by those of ordinary skill in the art, interface 126 can be included as part of controller 120.

The components of FIG. 1 may or may not be physically co-located. In this regard, devices 101 to 104 may be located remotely from DSD 106. Those of ordinary skill in the art will also appreciate that other embodiments can include more or less than those elements shown in FIG. 1 and that the disclosed processes can be implemented in other environments. For example, other embodiments can include a different number of devices providing data to DSD 106.

In FIG. 1, disk 150 is rotated by a spindle motor (not shown) and head 136 is positioned to read and write data on the surface of disk 150. In more detail, head 136 is connected to the distal end of actuator 130 which is rotated by Voice Coil Motor (VCM) 132 to position head 136 over disk 150 to read or write data in tracks on disk 150. A servo system (not shown) of controller 120 controls the rotation of disk 150 with SM control signal 38 and controls the position of head 136 using VCM control signal 34.

As will be appreciated by those of ordinary skill in the art, disk 150 may form part of a disk pack including multiple disks that are radially aligned with disk 150. In such implementations, head 136 may form part of a Head Stack Assembly (HSA) including heads arranged to read data from and write data to a corresponding disk surface in the disk pack.

In the example of FIG. 1, disk 150 includes cache memory 152, which is a group or zone of tracks located near an Outer Diameter (OD) portion of disk 150. Cache memory 152 can serve as a Media Based Cache (MBC) on disk 150 that can be written and read quicker than other portions of disk 150 due to its location near the OD portion. Other portions of disk 150, such as the Inner Diameter (ID) portion have tracks with a shorter length due to being located closer to the center of disk 150. Since all portions of disk 150 rotate at the same speed, longer tracks near the OD portion allow for more data to be written and read in a given period of time. In other embodiments, cache memory 152 can be located in other portions of disk 150 such as in a middle diameter portion of disk 150.

In some implementations, disk cache memory 152 may differ from other portions of disk 150 in that disk cache memory 152 may include non-overlapping tracks while other portions of disk 150 include overlapping tracks written using Shingle Magnetic Recording (SMR). Although SMR can increase the amount of data that can be stored in a given area of disk 150, the overlap in tracks can prevent new writes to a previously overlapped track since such a write would also affect the data written in the overlapping track. For this reason, tracks are generally sequentially written in SMR. Non-overlapping tracks in cache memory 152 can provide an area for caching data that is likely to be modified or rewritten with other data to an SMR portion of disk 150.

DSD 106 also includes NVSM 128 for storing data. While the description herein refers to solid-state memory generally, it is understood that solid-state memory may comprise one or more of various types of memory devices such as flash integrated circuits, Chalcogenide RAM (C-RAM), Phase Change Memory (PC-RAM), Programmable Metallization Cell RAM (PMC-RAM), Ovonic Unified Memory (OUM), Resistive RAM (RRAM), NAND memory (e.g., Single-Level Cell (SLC) memory, Multi-Level Cell (MLC) memory, Triple-Level Cell (TLC) memory, or any combination thereof), NOR memory, EEPROM, Ferroelectric Memory (FeRAM), Magnetoresistive RAM (MRAM), 3D XPoint memory, other discrete NVM (non-volatile memory) chips, or any combination thereof.

As shown in FIG. 1, NVSM 128 includes cache memory 18, which can be used to temporarily store or cache data that is either to be written to another memory location in DSD 106 (e.g., disk 150) or may serve as a read cache for storing copies of data from other memory locations in DSD 106 for quicker access.

DSD 106 also includes memory 140, which can include, for example, a Dynamic Random Access Memory (DRAM). In some embodiments, memory 140 can be a volatile memory used by DSD 106 to temporarily store data. In other embodiments, memory 140 can be an NVM that can be quickly accessed, such as certain Storage Class Memories (SCMs) like MRAM, PCM, RRAM, FeRAM, PMC-RAM, C-RAM, OUM, or a 3D XPoint memory. Data stored in memory 140 can include data read from NVM, data to be stored in NVM, instructions loaded from firmware 10 for execution by controller 120, and/or data used in executing firmware 10.

As shown in FIG. 1, memory 140 includes cache memory 12. As with cache memory 18 of NVSM 128, cache memory 12 can be used to cache data that is either to be written to another memory location in DSD 106 (e.g., disk 150 or NVSM 128) or may serve as a read cache for storing copies of data from other memory locations in DSD 106 for quicker access. In some implementations, cache memory 12 can include a portion of NVSM 128 that can store data faster, have a lower power usage for storing data, and/or provide for a longer usable life or endurance for writing data (e.g., a higher number of program/erase cycles). For example, cache memory 12 can include an SLC portion of NVSM 128 that can provide a greater endurance and a faster write time, while portions of NVSM 128 outside of cache memory 12 can include MLC or TLC portions as a main memory.

In other embodiments where DSD 106 includes multiple SSDs and/or HDDs, certain devices may serve as a cache memory and other devices may serve as a main memory. In one example, an SSD may provide a cache memory while another device such as an HDD may provide a main memory.

Memory 140 also stores device table 14 and information 16. As discussed below with reference to FIG. 2, device table 14 provides information or a profile for each of sensing devices 101 to 104. The profile can include, for example, configurations or information for the sensing device such as where data from the device should be cached, whether all data from the device should be cached, a minimum or maximum portion of cache memories 12, 18, and/or 152 that is allocated to the device, an allowable write latency for the device, a power usage associated with the device, criteria for compressing data from the device, and criteria for volatilely storing data from the device. Other implementations can include different information or configurations as part of a device profile.

Memory 140 also stores information 16, which provides information related to data received from sensing devices 101 to 104. As discussed with reference to FIG. 3 below, information 16 can include metadata associated with the received data. Some examples of information 16 can include the source of the data (e.g., device 101, 102, 103, or 104), a size of the data, an expected access frequency of the data, an expected time until the data will be accessed, a priority of the data, and a time when the data was received. Other implementations can include different information as part of information 16.

As discussed in more detail below, it is ordinarily possible to make better use of cache memories 12, 18, and 152 by using information about the sensing device sending the data (e.g., device table 14) and/or information about the data (e.g., information 16). In one aspect, data may or may not be cached based on the profile of the device sending the data and/or the information associated with the data. In another aspect, a particular cache memory may be selected for caching data over another cache memory in a different storage media based on the device sending the data and/or the information associated with the data.

In selecting a cache memory, cache memories 12, 18, and 152 can provide different tiers of caching with each tier having different advantages or disadvantages. In one example, cache memory 12 can include a DRAM that provides a first tier with a fastest write time, cache memory 18 can include an SLC portion of NVSM 128 that provides a second tier with a second fastest write time, and disk cache memory 152 provides a third tier of caching with a slowest write time. The different tiers of caching can have other attributes that differ among the tiers such as, for example, an amount of power used to store data, an endurance for reliably writing data in the cache memory, an amount of overhead needed to maintain the cache memory (e.g., garbage collection), an available storage capacity, or whether the data is non-volatilely stored.

In conventional systems, a host may provide information about data to be stored in a DSD so that a caching policy can result in decisions about which data should be cached or where certain data should be cached. The host in such conventional systems may have knowledge of the data needs and uses of different applications executing on the host and use a logical addressing (e.g., logical block addresses) to provide caching hints to the DSD. A driver executing on the host may also provide caching hints by indicating a priority of data to be stored in the DSD.

In contrast, sensing devices of the present disclosure communicate directly with the DSD without a host, such as in an Internet Of Things (IoT) application. As described in more detail below, DSD 106 considers which sensing device is sending the data and/or information related to the data to improve the use of cache memories in DSD 106 in the absence of a host.

In operation, interface 126 receives data from devices 101 to 104 via interface 126 for storing the data in either a cache memory or main memory of DSD 106. Controller 120 may buffer the received data in memory 140 before storing the data.

For data to be written on disk 150, a read/write channel (not shown) of controller 120 may encode the buffered data into write signal 36 which is provided to head 136 for magnetically writing data on disk 150. A servo system of controller 120 can provide VCM control signal 34 to VCM 132 to position head 136 over a particular track for writing the data.

In addition, controller 120 may need to read data from a memory of DSD 106 to provide the data to another device, migrate the data to another memory of DSD 106, or perform a maintenance operation (e.g., compression or garbage collection). To read data from disk 150, the servo system positions head 136 over a particular track on disk 150. Controller 120 controls head 136 to magnetically read data stored in the track and to send the read data as read signal 36. A read/write channel of controller 120 can then decode and buffer the data into memory 140 for use by controller 120 or for transmission to another device via interface 126.

For data to be stored in NVSM 128, controller 120 receives data from interface 126 and may buffer the data in memory 140. In one implementation, the data is then encoded into charge values for charging cells (not shown) of NVSM 128 to store the data.

To access data stored in NVSM 128, controller 120 in one implementation reads current values for cells in NVSM 128 and decodes the current values into data that can be used by controller 120 or transmitted to another device via interface 126.

FIG. 2 depicts an example of device table 14 including profiles for sensing devices 101 to 104 according to an embodiment. As shown in the example of FIG. 2, device table 14 includes information or configurations for each sensing device, such as where data from each device can be cached, whether all data from the device should be cached, a minimum portion and a maximum portion of cache memories 12, 18, and/or 152 allocated to each device, an allowable write latency for the device, a power usage associated with the device, criteria for compressing data from the device, and criteria for volatilely storing data from the device. Other implementations can include different information in a device profile.

The profile for a particular sensing device, such as device 101, can indicate particular cache memories where its data is allowed to be cached. In the example of FIG. 2, data received from device 101 can be cached in cache memory 12 or cache memory 18, but not in cache memory 152. The limitations on which cache memories may be used can be due to reasons such as, a particular read or write access speed of the cache memory, an amount of power used in reading or writing data in the cache memory, whether the cache memory is a volatile memory, or a limited storage capacity of the cache memory.

All of the data from some sensing devices may be cached while other sensing devices may provide data that is only cached under certain conditions, or never cached. In the example of FIG. 2, an indication of "Y" for device 102 means that all data from device 102 is cached, an indication of "N" for devices 101 and 103 means that only certain data is cached for devices 101 and 103, and no indication for device 104 can mean that none of the data from device 104 is ever cached.

Device table 14 in FIG. 2 also includes an indication of a minimum amount of storage capacity in the cache memories that is allocated to the sensing device. These allocations may be made to ensure that each sensing device has at least a certain amount of space available in the cache memories. Certain devices may consume more storage space and therefore have a larger amount of minimum storage capacity allocated to it. In some implementations, the minimum storage capacity is adjusted as needed based on the actual use of the cache memories by the sensing devices. Although the minimum allocated storage capacities are expressed as percentages in FIG. 2, other embodiments can use a storage capacity (e.g., 5 GB) rather than a percentage of a total storage capacity.

In addition, other implementations may only consider a minimum allocated storage capacity for a subset of cache memories 12, 18, and 152. In one example, the available storage space of cache memory 12 may be significantly smaller than the storage capacities available in cache memory 18 and cache memory 152. In such an example, minimum allocations may only be made for cache memory 12 to better manage the use of cache memory 12.

The write latency shown in FIG. 2 indicates an allowable amount of time for writing the data received from the sensing device into a memory of DSD 106. Certain devices may require a shorter write latency than other devices depending on, for example, whether data is received from the device in short bursts or as a continuous stream. In the example of FIG. 2, the write latency of "1" for device 102 can indicate that the data received from device 102 must be cached or written quickly to memory, while the write latency of "3" for device 104 can indicate that the data received from device 104 does not need to be cached or stored as quickly. In this regard, certain storage media may provide for faster writing in its respective cache memory. In one example, cache memory 12 in memory 140 can provide a shortest write latency, followed by cache memory 18 in NVSM 128, and cache memory 152 on disk 150 having the greatest write latency. Data can be cached in a particular cache memory based on the allowed write latency specified in the profile for the device.

The power indication in device table 14 provides a power level or power usage that is associated with the device. Certain devices may have a particular power level associated with them based on the frequency at which they need to store data. Devices that need to store data more often can be associated with a higher power usage that may steer data from the device toward cache memories that operate on less power.

The compression criteria in device table 14 can represent, for example, a predetermined amount of time until data from the device is eligible for compression and/or a predetermined amount of data that must be received from the device before its data can be compressed. The compression criteria shown in FIG. 2 can represent different combinations of these criteria. Other implementations may consider different compression criteria.

The volatile criteria in device table 14 can represent an amount of time allowed for data received from the sensing device to remain cached in a volatile memory and/or an amount of data received from the sensing device that is allowed to remain in volatile memory. Other implementations using volatile criteria may consider different criteria. Memory 140 in some implementations can include a volatile memory. In such implementations, the use of cache memory 12 in volatile memory 140 may be limited based on the volatile criteria of device table 14.

The maximum allocated storage capacities shown in device table 14 can represent a maximum amount of storage capacity in one or more cache memories that a particular sensing device is allowed to use for caching at any given time. The maximum storage capacities can help prevent a particular sensing device from using too much of the available cache memory at the expense of the other sensing devices, while still allowing a sensing device to use more than its allocated minimum storage capacity to take advantage of unused cache memory.

Over time, data from a sensing device can be migrated from one or more cache memories to a main memory to free up space in the one or more cache memories. Since it may take time before data can be migrated from a cache memory, limiting a sensing device to a maximum storage capacity helps ensure that there will be some space available in the cache memory for data received from a different sensing device. In some implementations, the maximum storage capacity is adjusted as needed based on the actual use of the cache memories by the sensing devices. Although the maximum allocated storage capacities are expressed as percentages in FIG. 2, other embodiments can use an overall storage capacity rather than a percentage of a total storage capacity.

In addition, other implementations may only consider a maximum allocated storage capacity for a subset of cache memories 12, 18, and 152. In one example, the available storage space of cache memory 12 may be significantly smaller than the storage capacities available in cache memory 18 and cache memory 152. In such an example, maximum allocations may only be made for cache memory 12 to better manage the use of cache memory 12.

FIG. 3 depicts an example of information 16 which includes information related to data received by DSD 106 according to an embodiment. Information 16 can, in some implementations, form a write log or other record of data that has been received from sensing devices 101 to 104. Other embodiments may include different information as part of information 16 than that shown in FIG. 3.

As shown in FIG. 3, the received data is indexed in information 16 by the time at which the data is received. The index can serve as a key that allows for the data to be retrieved. Since the data is received from sensing devices 101 to 104, the data is not addressed by Logical Block Addresses (LBAs) of a host, as is usually the case for data received from a host.

The time at which the data is received is included in information 16, together with the source or sensing device from which the data was received. Information 16 also includes a size indicator that can indicate a relative size of the data received from the sensing device, such as whether the size of the data is between certain threshold sizes. In other embodiments, the actual size or an approximate size of the received data can be used in information 16 instead.

A priority indicator of information 16 can indicate a relative priority for the received data. The priority can be based on which device sends the data or determined by DSD 106 based on, for example, a history of which data has been retrieved in the past or based on other data received from a different sensing device. In one example, sensing device 102 can be a motion sensor and sensing device 103 can be a video camera in a location near the motion sensor. Data received from the motion sensor indicating motion can cause DSD 106 to prioritize video data received from the video camera around the time of receiving the data from the motion sensor. Such higher priority video data may then be stored in redundant locations in DSD 106, stored in a more reliable storage medium, or cached in a non-volatile storage medium rather than a volatile storage medium.

Information 16 in the example of FIG. 3 also includes an expected access indicator. The expected access indicator can indicate an expected access frequency of the received data and/or an expected time until the received data will be accessed. This information could be learned by DSD 106 based on an access history of data previously received from a particular sensing device or can be based on a profile for the sensing device sending the data. By knowing an expected access frequency or expected time until a next access, DSD 106 can better determine whether to cache the received data and where to cache the received data if it is to be cached.

Example Caching Processes

Figure 4:
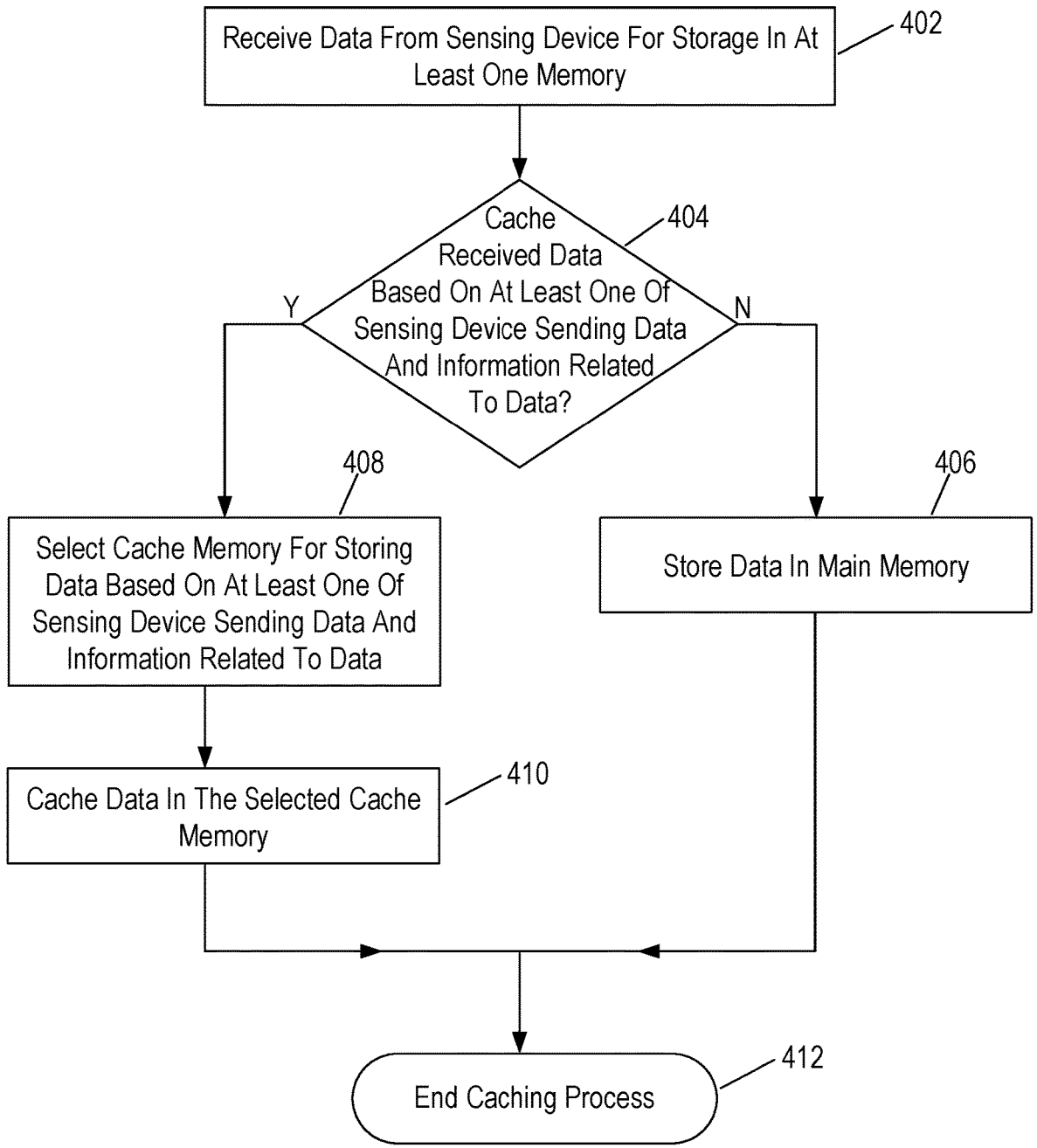
FIG. 4 is a flowchart for a caching process according to an embodiment.

FIG. 4 is a flowchart for a caching process that can be performed by controller 120 executing firmware 10 according to an embodiment. In block 402, controller 120 via interface 126 receives data from a sensing device (e.g., sensing device 101, 102, 103, or 104) for storage in at least one memory of DSD 106 (e.g., disk 150 or NVSM 128).

In block 404, controller 120 determines whether to cache the received data based on at least one of the sensing device sending the data and information related to the received data. Controller 120 may use device table 14 to determine if the profile for the device indicates that the data should be cached or if information 16 indicates that the data should be cached. For example, device table 14 may indicate whether all of the data received from the device should be cached or if the allowed write latency requires caching the data in a cache memory that can be written to quicker than storing the data in a final location. In another example, an expected access or priority of information 16 may provide an indication of whether the received data should be cached.

If it is determined in block 404 that the received data should not be cached, controller 120 in block 406 stores the received data in a main memory (e.g., non-cache portions of disk 150 or NVSM 128) without caching the received data. The caching process then ends in block 412.

On the other hand, if it is determined in block 404 that the received data should be cached, controller 120 in block 408 selects a cache memory for storing the data based on at least one of the sensing device sending the data and information related to the data. Device table 14 and information 16 can be further used in block 408 to determine which of cache memory 12, cache memory 18, or cache memory 152 may be better suited to caching the received data. FIGS. 5 and 6 discussed below provide two different examples of using information about the sensing device and information about the received data to determine where to cache the received data. In some embodiments, the decision on whether to cache the received data or where to cache the received data can be based on a weighted function that considers different information about the sensing device and/or different information related to the data as different weighted factors.

Figure 5A:
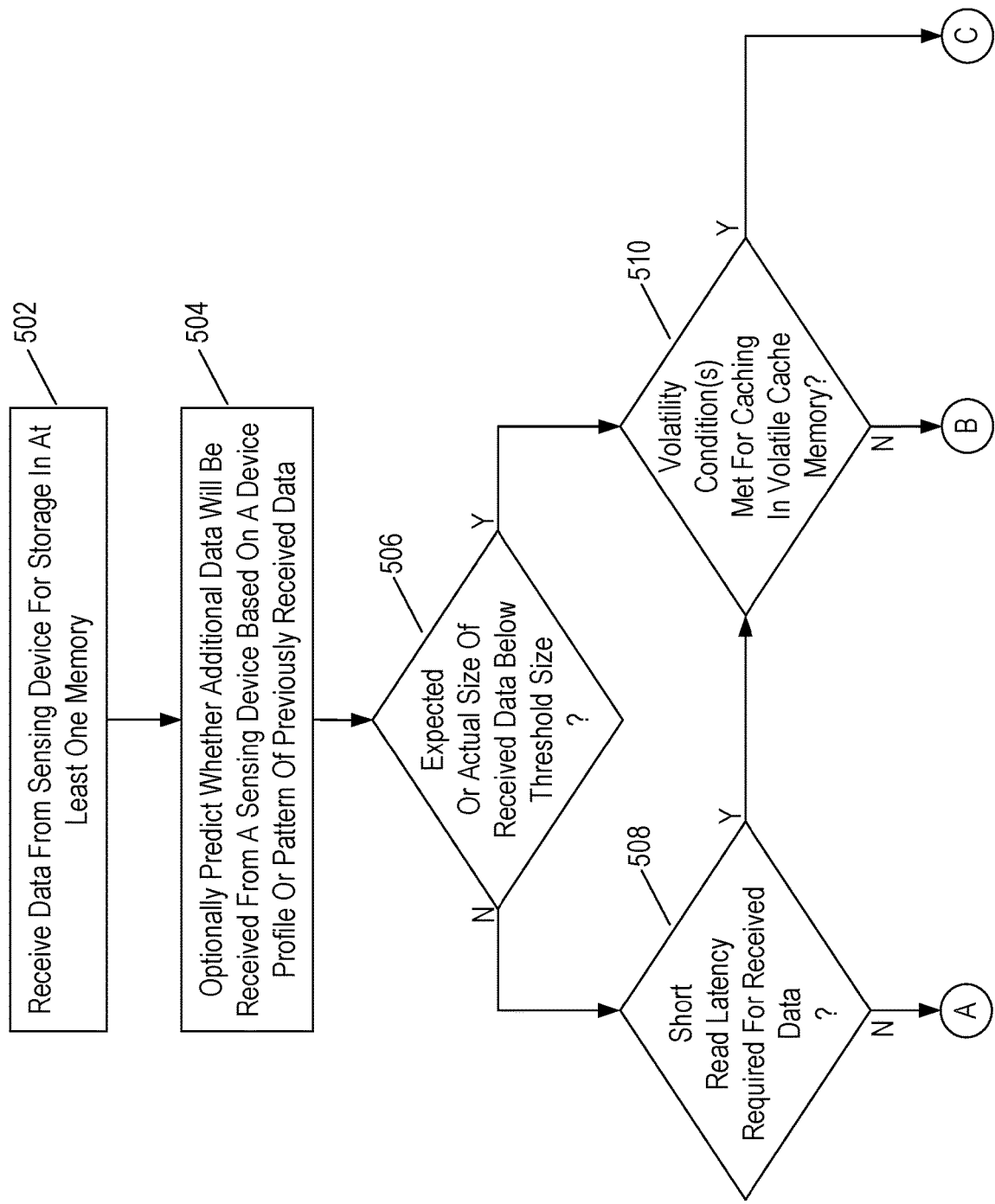
FIG. 5A is a first part of a flowchart for an example caching process according to an embodiment.
Figure 5B:
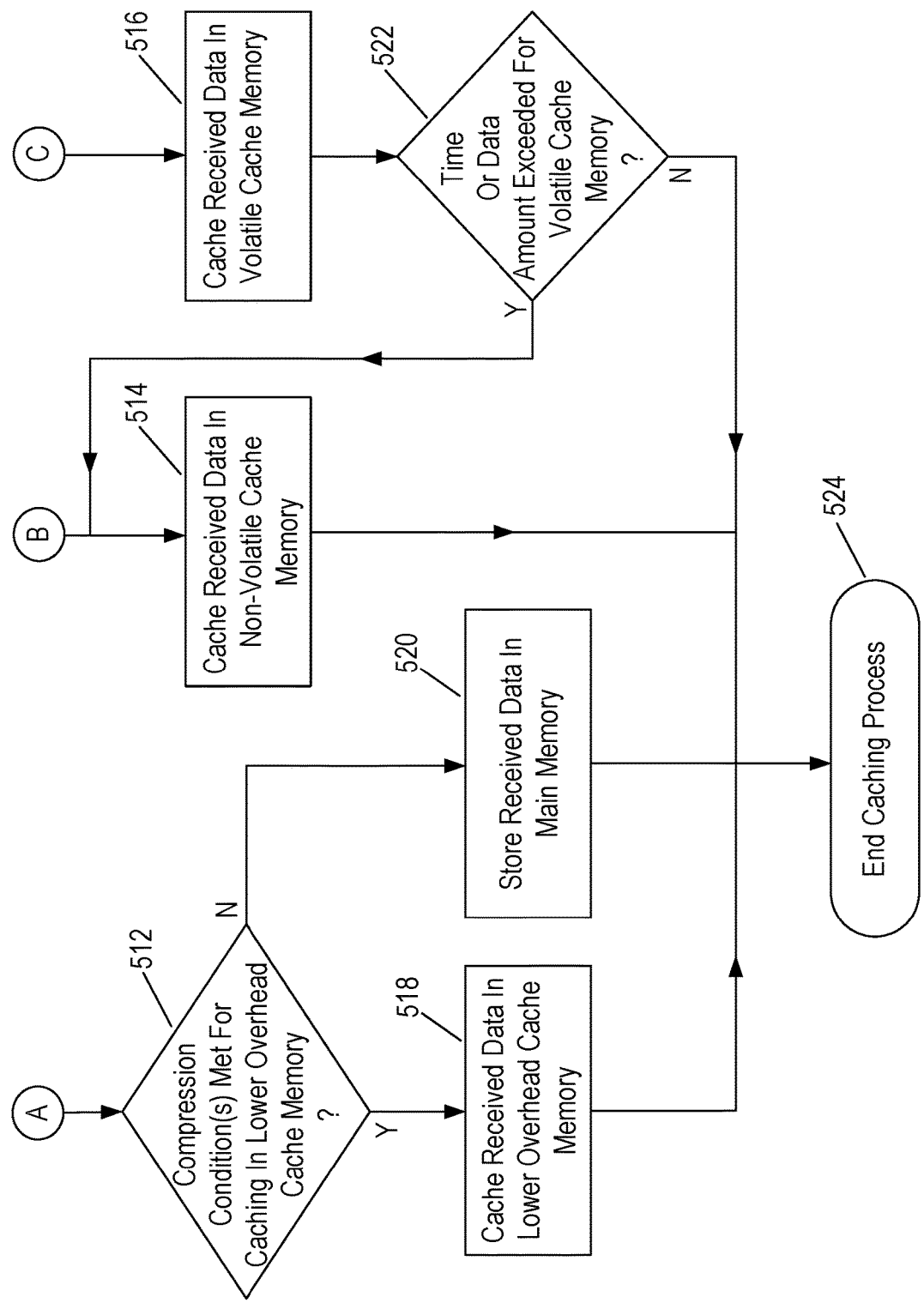
FIG. 5B is a second part of the flowchart for the example caching process of FIG. 5A.
Figure 6:
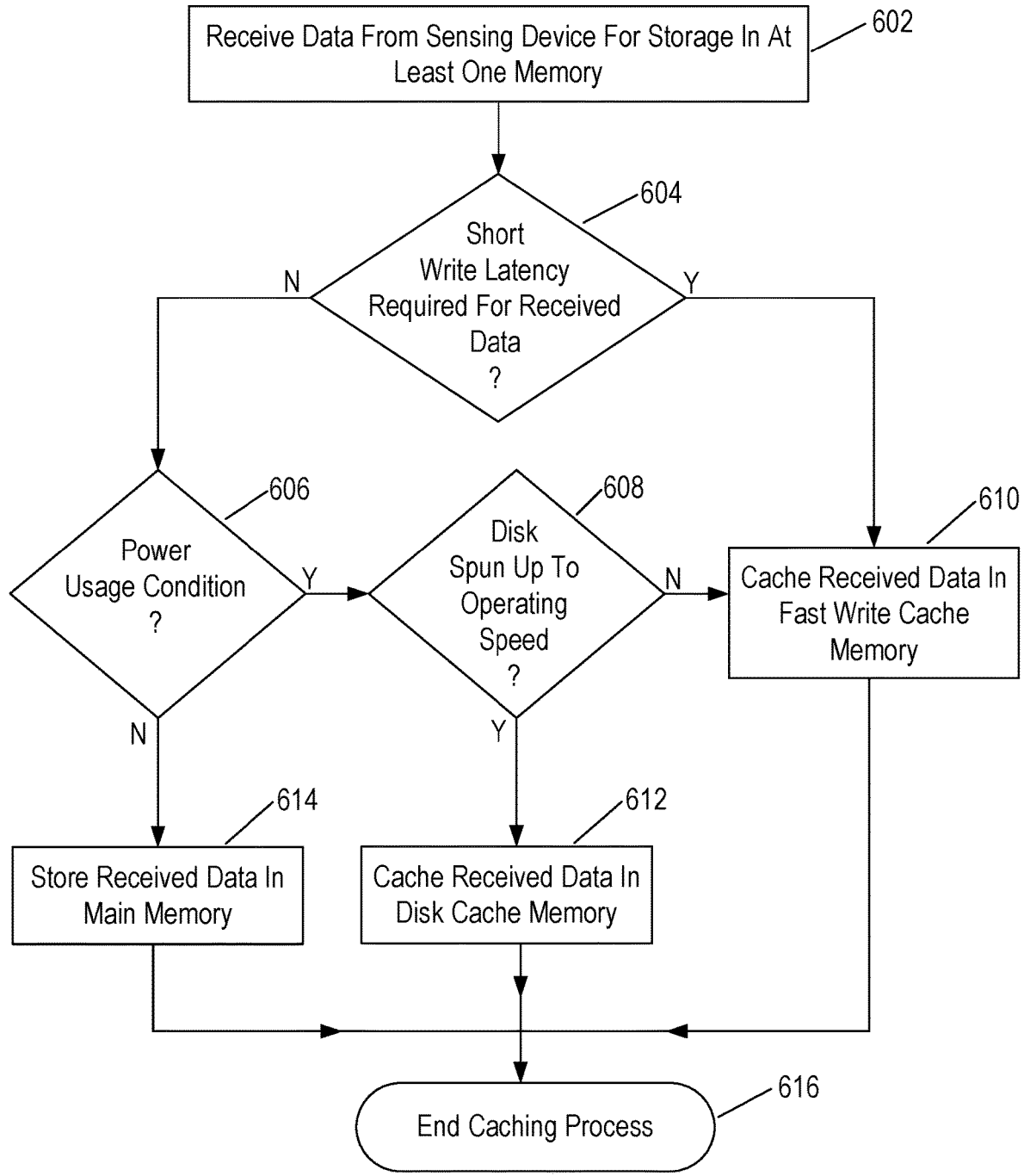
FIG. 6 is a flowchart for an example caching process according to another embodiment.

FIGS. 5A and 5B provide a flowchart for an example caching process that can be performed by controller 120 executing firmware 10 according to an embodiment. In block 502, controller 120 receives data from a sensing device for storage in at least one memory of DSD 106.

In block 504, controller 120 optionally predicts whether additional data will be received from a sensing device based on a profile of a sensing device or a pattern of previously received data. In one example, a profile in device table 14 can include an indication of when data has historically been received from a sensing device (e.g., every morning between 10 am and 11 am) or whether data received from a particular sensing device is typically received in bursts that are close together in time. Information 16 can be used by controller 120 to identify such historical patterns or receiving patterns or to make the prediction in block 504 of whether additional data will be received.

In block 506, controller 120 determines whether an expected size or an actual size of received data is below a threshold size. The expected size of received data can be based on a prediction in block 504 of whether additional data will be received from a sensing device within a certain period of time. Controller 120 in block 506 may refer to information 16 to determine a size or an indication of the size of the received data, and then either compare this information with the threshold size or add an expected size to the actual size for comparison to the threshold size.

The size or expected size of the received data can be used to determine where the received data should be cached or to provide a preference for caching the data in a particular cache memory. The size or expected size of the received data can be used to conserve space in the different cache memories, which can have different storage capacities. Smaller sizes of received data may be better suited for a cache memory with a smaller storage capacity and larger sizes of received data may be better suited for a cache memory with a larger storage capacity.

In addition, the storage media of different cache memories may be better suited to either sequentially writing a large amount of data at one time or writing smaller portions of data at more random times. For example, cache memory 18 in NVSM 128 or cache memory 12 in memory 140 may generally be better suited for writing smaller portions of data at different times than cache memory 152 on disk 150 due to the mechanical latency involved with positioning head 136 when writing data on disk 150.

The decision in block 506 can provide a preference for caching the received data in cache memory 152 on disk 150 if the received data has a size or expected size that is at least the threshold size. Alternatively, if the received data has a size or expected size that is less than the threshold size, the received data is cached in cache memory 12 of memory 140 or in cache memory 18 of NVSM 128.

If it is determined in block 506 that the expected size or actual size of the received data is below the threshold size, controller 120 in block 510 determines whether one or more volatility conditions are met for caching the received data in a volatile cache memory (e.g., cache memory 12). The volatile condition or conditions can include, for example, a predetermined amount of time allowed for data received from the sensing device to remain cached in a volatile memory and/or a predetermined amount of data received from the sensing device that is allowed to remain in a volatile memory. These limits can form the volatility criteria of device table 14 and be used to reduce the likelihood that data from the sensing device might be lost due to an unexpected power loss at DSD 106.

If it is determined that the volatility condition or conditions are not met in block 510, the received data is cached in a non-volatile cache memory (e.g., cache memory 18) in block 514 of FIG. 5B. The process then ends in block 524.

On the other hand, if it is determined that the volatility condition or conditions are met in block 510, the received data is cached in a volatile cache memory (e.g., cache memory 12) in block 516. In some implementations, the volatile cache memory may provide the fastest storage of the received data, which can improve the performance of DSD 106 in storing data received from the sensing devices. However, the volatile nature and a possibly smaller size of the volatile cache memory may make the volatile cache memory less desirable for larger sized data or for data that is required to be non-volatilely stored.

In block 522, controller 120 checks whether a predetermined amount of time has been exceeded for volatilely storing the received data or whether a predetermined amount of data has been exceeded for caching the received data in the volatile memory. Controller 120 may refer to the volatility criteria of device table 14 in making this determination.

If the predetermined time or predetermined amount of data has been exceeded in block 522, controller 120 caches the received data in a non-volatile cache memory (e.g., cache memory 18) in block 514. The caching process then ends in block 524.

Returning to block 506 of FIG. 5A, if it is determined that the expected or actual size of the received data is not less than the threshold size, controller 120 in block 508 determines whether there is a short read latency required for the received data. In some implementations, this can be determined from device table 14 where a profile for the device sending the data indicates an allowable read latency. In other implementations, information 16 can indicate whether a low read latency is required by the priority of the data or an expected time until a next access of the data. The decision in block 508 can be seen as an additional determination as to whether the received data can be cached in cache memory 152 on disk 150.

If the data needs to be accessed quickly (i.e., a short read latency is required), it is generally better to cache the data in cache memory 12 or cache memory 18 since these cache memories do not involve a potential mechanical latency in retrieving the data. If a short read latency is required in block 508, the process proceeds to block 510 discussed above to determine whether to cache the received data in volatile cache memory 12 or in non-volatile cache memory 18.

If a short read latency is not required in block 508, controller 120 in block 512 of FIG. 5B checks whether one or more compression conditions are met for a lower overhead cache memory. A lower overhead cache memory tier can include a cache memory where data can be accessed for compression and deleted or obsoleted after compression with less cost in maintenance, power, and/or performance. In one example, the lower overhead cache memory can include cache memory 152 on disk 150 where deleted data can be overwritten without having to first erase a block of memory (e.g., as in a flash memory cache) or later perform garbage collection to reclaim a portion of the memory storing the deleted data (e.g., as in a flash memory with indirection or an SMR portion of disk 150).

The compression conditions can include, for example, a predetermined amount of time before the received data is eligible for compression or a predetermined amount of data received from the sensing device until the received data is eligible for compression. This information can be included as part of a profile for the sensing device, such as the compression criteria in device table 14.

In one implementation, if there is more than a predetermined amount of time until the received data is eligible for compression, the received data may be stored in a location in main memory (e.g., a portion of NVSM 128 outside of cache memory 18 or a portion of disk 150 outside of cache memory 152) as opposed to being cached. In another implementation, if there is more than a predetermined amount of data still to be received from the sensing device before the received data is eligible for compression, the received data may be stored in a location in main memory as opposed to being cached. This can ordinarily allow for received data that is closer to being compressed to be cached so that the received data can be compressed before it is stored in its final location in main memory with less overhead resulting from the deletion of the uncompressed data in the cache memory.

For example, storing data that will soon be compressed and obsoleted from a main memory such as an SMR portion of disk 150 will increase the need for garbage collection in the SMR portion to reclaim the area storing the obsoleted data. On the other hand, storing such soon to be compressed data in disk cache memory 152 in non-overlapping tracks can reduce the need for garbage collection in the main memory since the obsoleted data can simply be overwritten in cache memory 152 after compression.

If it is determined in block 512 that the compression condition or conditions are met for caching, controller 120 in block 518 caches the data in the lower overhead cache memory (e.g., disk cache memory 152). If the compression condition or conditions are not met for caching, controller 120 in block 520 stores the received data in a main memory outside of the cache memories. The caching process then ends in block 524.

By considering the device that is sending the data and/or information related to the received data, it is ordinarily possible to better manage whether and where to cache data received from a sensing device to improve performance and operational efficiency of DSD 106. Other caching processes may consider different information about the sensing device or the received data, as in the example caching process of FIG. 6 discussed below.

FIG. 6 is a flowchart for an example caching process that can be performed by controller 120 executing firmware 10 according to another embodiment. In block 602, controller 120 receives data from a sensing device for storage in at least one memory of DSD 106. In block 604, controller 120 determines whether a short write latency is required for the received data. This can include, for example, comparing an allowed write latency in device table 14 to a threshold write latency.

If it is determined that a short write latency is required for the received data, controller 120 in block 610 caches the received data in a fast write cache memory. In one example, the fast write cache memory can include cache memory 12 in memory 140 (e.g., DRAM), while cache memory 18 in NVSM 128 (e.g., flash memory) and cache memory 152 on disk 150 may provide for a relatively slower writing of data than cache memory 12. After the received data is cached in block 610, the caching process ends in block 616.

If it is determined in block 604 that a short write latency is not required for the received data, controller 120 checks device table 14 in block 606 for a power usage condition associated with the sensing device sending the received data.

In some implementations, the power usage indicated in device table 14 for the sensing device can indicate whether the received data is to be stored using a low amount of power. This can allow DSD 106 to use less power for certain sensing devices that may store data more often, such as sensing devices that provide a continuous stream of data, to consume less power over time. Sensing devices that send data less frequently or sensing devices that provide more discrete data sets may not be as restricted in their power usage.

If there is no power usage condition for the received data in block 606, controller 120 in block 614 stores the received data in a main memory (i.e., outside of the cache memories). The caching process then ends in block 616.

On the other hand, if there is a power usage condition for the sensing device sending the data, controller 120 in block 608 checks whether disk 150 is spun up to an operating speed. This information may be available from a servo controller of controller 120 that controls rotation of disk 150. Disk 150 may be spun down below an operating speed during periods of inactivity or when disk 150 is not being used for storing data. This can save power by not needing to provide as much power to a spindle motor of DSD 106 for spinning disk 150. However, if disk 150 is already spun up to an operating speed, the received data can generally be cached in disk cache memory 152 without incurring much additional power usage since disk 150 is already spinning and there is no need to supply additional power to spin disk 150 up to the operating speed. The received data is then cached in disk cache memory 152 in block 612 and the caching process of FIG. 6 ends in block 616.

In some implementations, caching the received data in disk cache memory 152 can also save power over storing the data in the main memory since disk cache memory 152 may require less maintenance or overhead for storing data over a period of time. For example, the main memory may include portions of disk 150 and/or NVSM 128 that may require garbage collection from time to time. Storing the received data in disk cache memory 152 may then reduce power usage by not needing to perform as much garbage collection in the main memory.

If it is determined that disk 150 is not spun up to an operating speed in block 608, controller 120 caches the received data in the fast write cache memory (e.g., cache memory 12), and the process ends in block 616.

As noted above for the example caching process of FIG. 6, other caching processes may consider different information about the sensing device sending the data or the received data.

Figure 7:
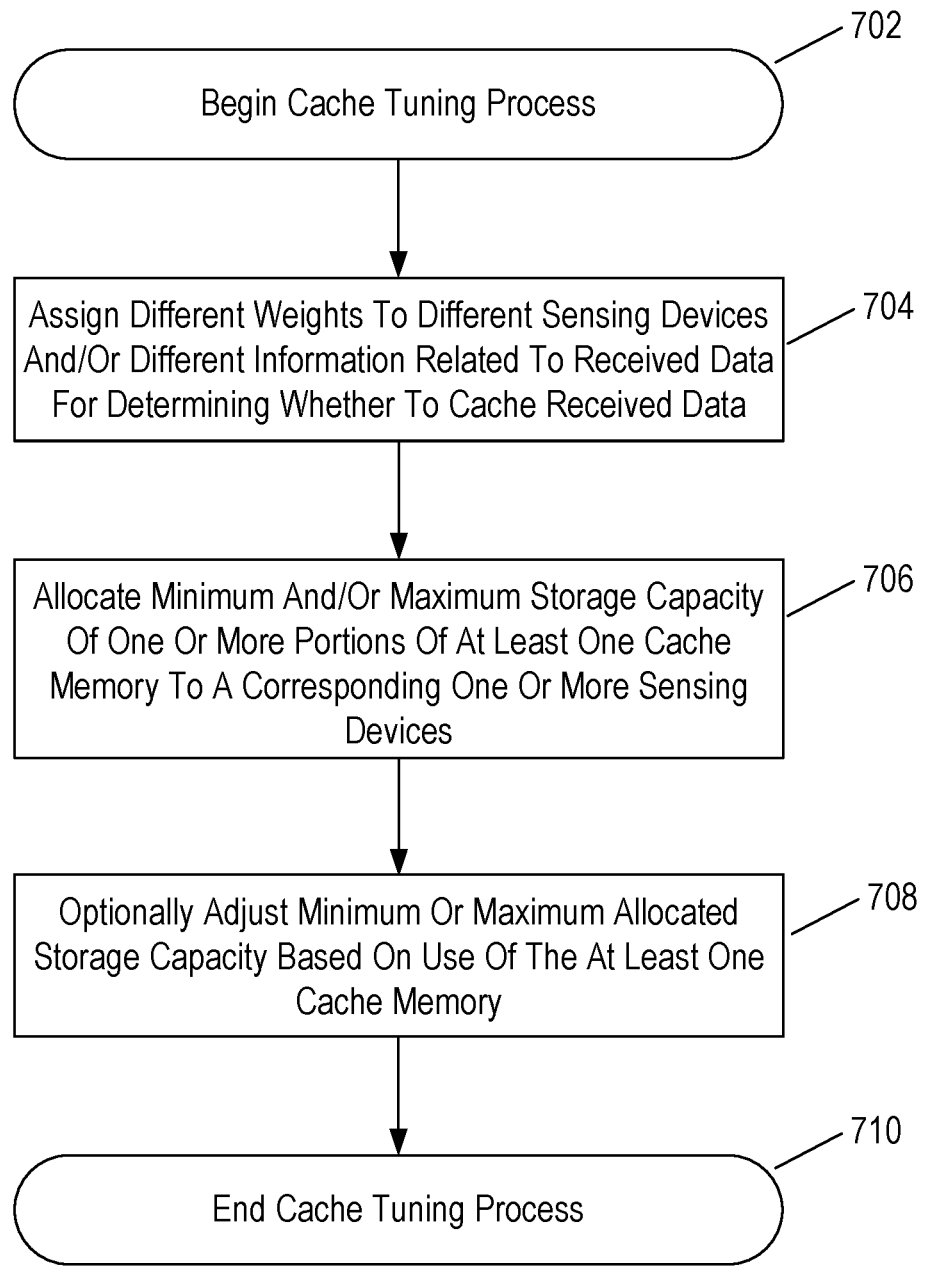
FIG. 7 is a flowchart for a cache tuning process according to an embodiment.

FIG. 7 is a flowchart for a cache tuning process that can be performed by controller 120 executing firmware 10 according to an embodiment to initialize or improve usage of the cache memories. The process of FIG. 7 begins in block 702 and may be performed when DSD 106 is first configured for receiving data from sensing devices 101 to 104 or when a sensing device is connected or removed from communication with DSD 106. In other implementations, the process of FIG. 7 can be performed periodically as a background activity when DSD 106 is in an idle state or receives a reduced amount of data from the sensing devices.

The process of FIG. 7 can ordinarily allow for a more effective use of the cache memories of DSD 106. As noted above, the decision on whether to cache the received data or where to cache the received data in some implementations can be based on a weighted function that considers different information about the sensing device and/or different information related to the received data as different weighted factors.

In block 704, controller 120 assigns different weights to different sensing devices and/or different information related to the received data for determining whether to cache data received from a sensing device. For example, controller 120 may assign more weight to caching data received from sensing device 101 than to caching data received from sensing device 102 so that more of the data from sensing device 102 is cached. In another example, controller 120 may assign more weight to a maximum allowed write latency than to a weight for power usage so that more data can be quickly cached. In yet another example, more weight may be given to an expected time until access than to a weight assigned to a maximum time allowed for volatilely storing data so that more data can be stored in a volatile cache memory with a shorter read latency.

In block 706, controller 120 allocates a minimum and/or maximum storage capacity of one or more portions of at least one cache memory to a corresponding one or more sensing devices. In the case of an allocated minimum, controller 120 can reserve at least a minimum amount of one or more cache memories for caching data from a particular sensing device to ensure sufficient space for caching data from the sensing device. In the example of device table 14 in FIG. 2, controller 120 allocates at least 25% of the cache memories 12, 18, and 152 to device 101, 45% to device 102, 25% to device 103, and no minimum storage capacity to device 104. In other examples, the minimum allocations can be for less than all of the available cache memories, such as only for the fastest cache memory, which may also have the least space available for caching data.

In the case of an allocated maximum, controller 120 can limit the amount of one or more cache memories that can be used by a particular sensing device for caching data so that other sensing devices have space to cache data. In the example of device table 14 in FIG. 2, controller 120 limits sensing device 101 to 40% of the cache memories 12, 18, and 152, limits device 102 to 70%, limits device 103 to 40%, and does not limit device 104. In other examples, the maximum allocations can be for less than all of the available cache memories, such as only for the fastest cache memory, which may also have the least space available for caching data.

In block 708, controller 120 optionally adjusts a minimum or maximum allocated storage capacity based on use of the at least one cache memory by the sensing devices. This can, for example, allow for the increase of a minimum allocation for a sensing device that is caching significantly more data than other sensing devices. One or more minimum allocations for the other sensing devices can be lowered to compensate for the increased minimum allocation. In another example, a maximum allocation can be increased based on the greater use of the cache memories by one sensing device as compared to other sensing devices. The maximum allocation of one or more other sensing devices can be decreased to compensate for the increased maximum allocation. The cache tuning process of FIG. 7 ends in block 710.

As discussed above, in the absence of a host to provide information for improving cache usage, DSD 106 can consider which sensing device is sending data and/or information related to the received data to improve the use of cache memories in DSD 106.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a DSP, an ASIC, a FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A device, comprising:
at least one memory for storing data;
a first cache memory located in a first storage medium;

a second cache memory located in a second storage medium; and a controller configured to:
receive data from a sensing device of a plurality of sensing devices in communication with the device for storage in the at least one memory; and
select the first cache memory or the second cache memory for caching the received data based at least in part on which sensing device of the plurality of sensing devices sent the data.

2. The device of claim 1, wherein the controller is further configured to determine whether to cache the received data based on at least one of which sensing device of the plurality of sensing devices sent the data and information related to the received data.

3. The device of claim 2, wherein the information related to the received data indicates at least one of a size of the received data, an expected access frequency of the received data, an expected time until the received data will be accessed, and a time when the received data was received.

4. The device of claim 1, wherein the controller is further configured to assign different weights to different sensing devices of the plurality of sensing devices in selecting the first cache memory or the second cache memory for caching the received data.

5. The device of claim 1, further comprising a volatile cache memory, and wherein the controller is further configured to determine whether to cache the received data in the volatile cache memory based on at least one of a predetermined amount of time allowed for data received from the sensing device to remain cached in the volatile cache memory and a predetermined amount of data received from the sensing device that is allowed to remain cached in the volatile cache memory.

6. The device of claim 1, wherein the controller is further configured to allocate at least one of a minimum storage capacity and a maximum storage capacity of one or more portions of at least one of the first cache memory and the second cache memory to one or more corresponding sensing devices of the plurality of sensing devices for caching data received from the respective one or more corresponding sensing devices.

7. The device of claim 6, wherein the controller is further configured to adjust at least one allocated minimum storage capacity or allocated maximum storage capacity based on usage of the one or more portions by the respective one or more corresponding sensing devices.

8. The device of claim 1, wherein the controller is further configured to determine whether to cache the received data based on at least one of a predetermined amount of time until the received data is eligible for compression and a predetermined amount of data received from the sensing device until the received data is eligible for compression.

9. The device of claim 1, wherein the controller is further configured to determine whether to cache the received data based on a power usage associated with the sensing device.

10. The device of claim 1, wherein the controller is further configured to determine whether to cache the received data based on an amount of latency allowed for storing or retrieving data received from the sensing device.

11. The device of claim 1, wherein the controller is further configured to:
predict whether additional data will be received from the sensing device based on at least one of a profile of the sensing device and a pattern of data previously received from the sensing device; and
select the first cache memory or the second cache memory for caching the received data based at least in part on the prediction of whether additional data will be received from the sensing device.

12. The device of claim 1, wherein the device is a Data Storage Device (DSD).

13. A method of operating a device, the method comprising:
receiving data for storage in at least one memory of the device from a sensing device of a plurality of sensing devices in communication with the device;
determining whether to cache the received data based on at least one of which sensing device of the plurality of sensing devices is sending the data and information related to the received data; and
selecting a cache memory from among a plurality of cache memories of the device for caching the received data based at least in part on which sensing device of the plurality of sensing devices sent the data.

14. The method of claim 13, wherein the information related to the received data indicates at least one of a size of the received data, an expected access frequency of the received data, an expected time until the received data will be accessed, and a time when the received data was received.

15. The method of claim 13, further comprising assigning different weights to at least one of different sensing devices and different information related to the received data in determining whether to cache the received data.

16. The method of claim 13, wherein the plurality of cache memories includes a volatile cache memory, and wherein the method further comprises determining whether to select the volatile cache memory for caching the received data based on at least one of a predetermined amount of time allowed for data received from the sensing device to remain cached in the volatile cache memory and a predetermined amount of data received from the sensing device that is allowed to remain cached in the volatile cache memory.

17. The method of claim 13, further comprising allocating at least one of a minimum storage capacity and a maximum storage capacity of one or more portions of the plurality of cache memories to one or more corresponding sensing devices for caching data received from the respective one or more corresponding sensing devices.

18. The method of claim 17, further comprising adjusting at least one allocated minimum storage capacity or allocated maximum storage capacity based on usage of the one or more portions of the plurality of cache memories by the respective one or more corresponding sensing devices.

19. The method of claim 13, further comprising determining whether to cache the received data based on at least one of a predetermined amount of time until the received data is eligible for compression and a predetermined amount of data received from the sensing device until the received data is eligible for compression.

20. The method of claim 13, further comprising determining whether to cache the received data based on a power usage associated with the sensing device.

21. The method of claim 13, further comprising determining whether to cache the received data based on an amount of latency allowed for storing or retrieving data received from the sensing device.

22. The method of claim 13, further comprising:
predicting whether additional data will be received from the sensing device based on at least one of a profile of the sensing device and a pattern of data previously received from the sensing device; and selecting a cache memory of the plurality of cache memories for caching the received data based at least in part on the prediction of whether additional data will be received from the sensing device.

23. The method of claim 13, wherein the device is a Data Storage Device (DSD).

24. A non-transitory computer readable medium storing computer-executable instructions for operating a device, wherein when the computer-executable instructions are executed by a controller of the device, the computer-executable instructions cause the controller to:
  receive data from a sensing device of a plurality of sensing devices in communication with the device for storage in at least one memory of the device; and
  select a first cache memory or a second cache memory of the device for caching the received data based at least in part on which sensing device of the plurality of sensing devices sent the data.

* * * * *